W. H. MUZZY.
CASH REGISTER.
APPLICATION FILED JUNE 8, 1905.
941,378.
Patented Nov. 30, 1909.
4 SHEETS—SHEET 1.
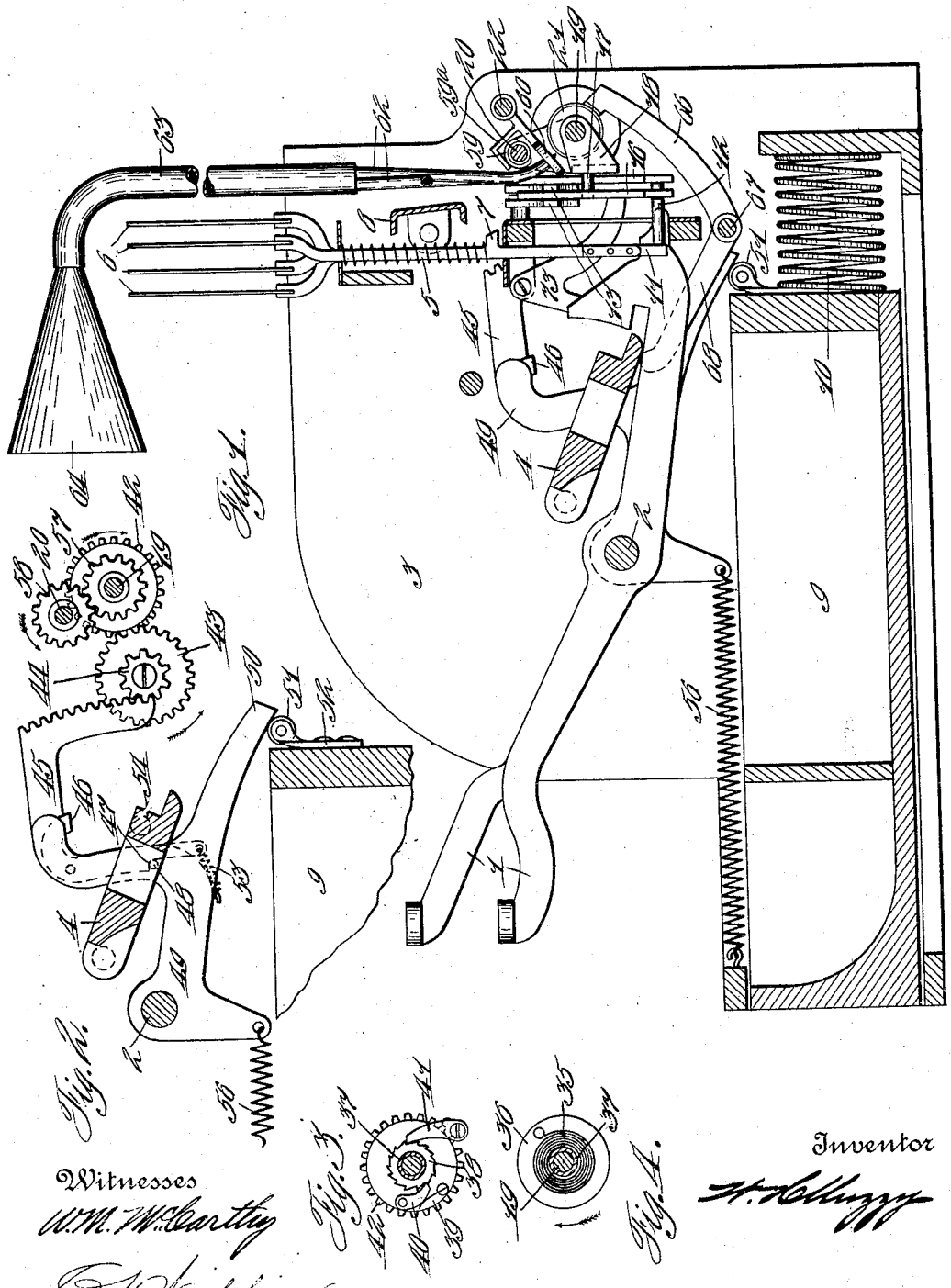
Witnesses
Inventor W. H. MUZZY.
CASH REGISTER.
APPLICATION FILED JUNE 8, 1905.
941,378.
Patented Nov. 30, 1909.
4 SHEETS—SHEET 2.
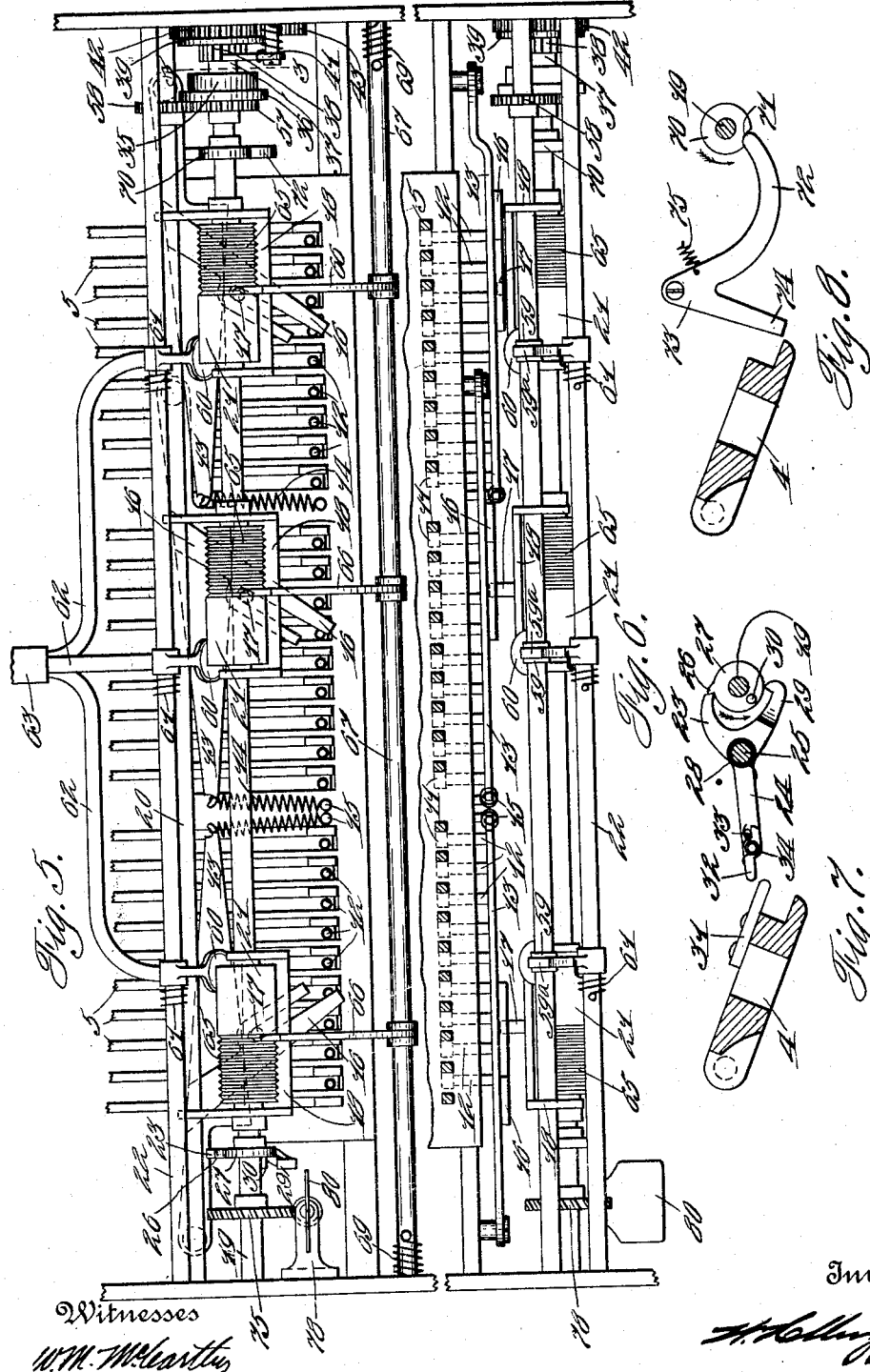

W. H. MUZZY.
CASH REGISTER.
APPLICATION FILED JUNE 8, 1905.
941,378.
Patented Nov. 30, 1909.
4 SHEETS—SHEET 3.
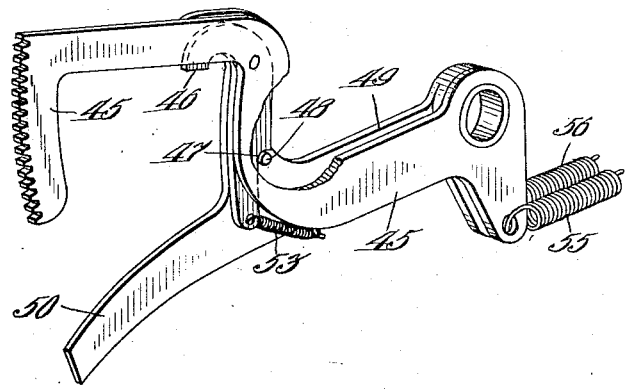
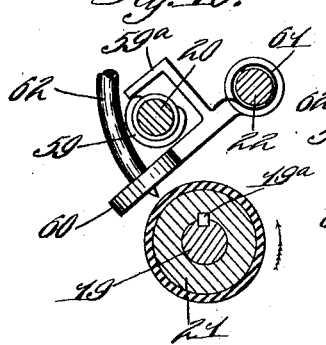 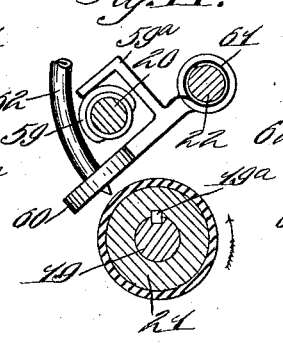 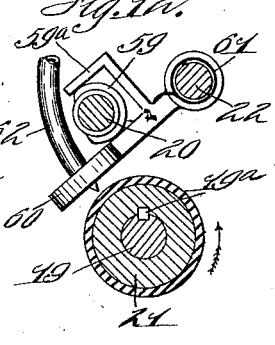
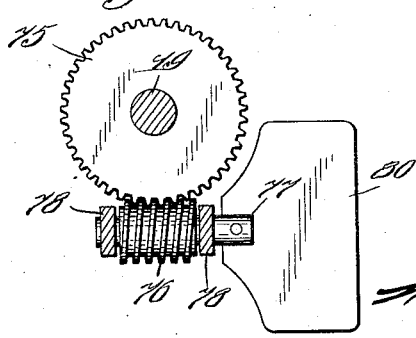
Witnesses
Inventor

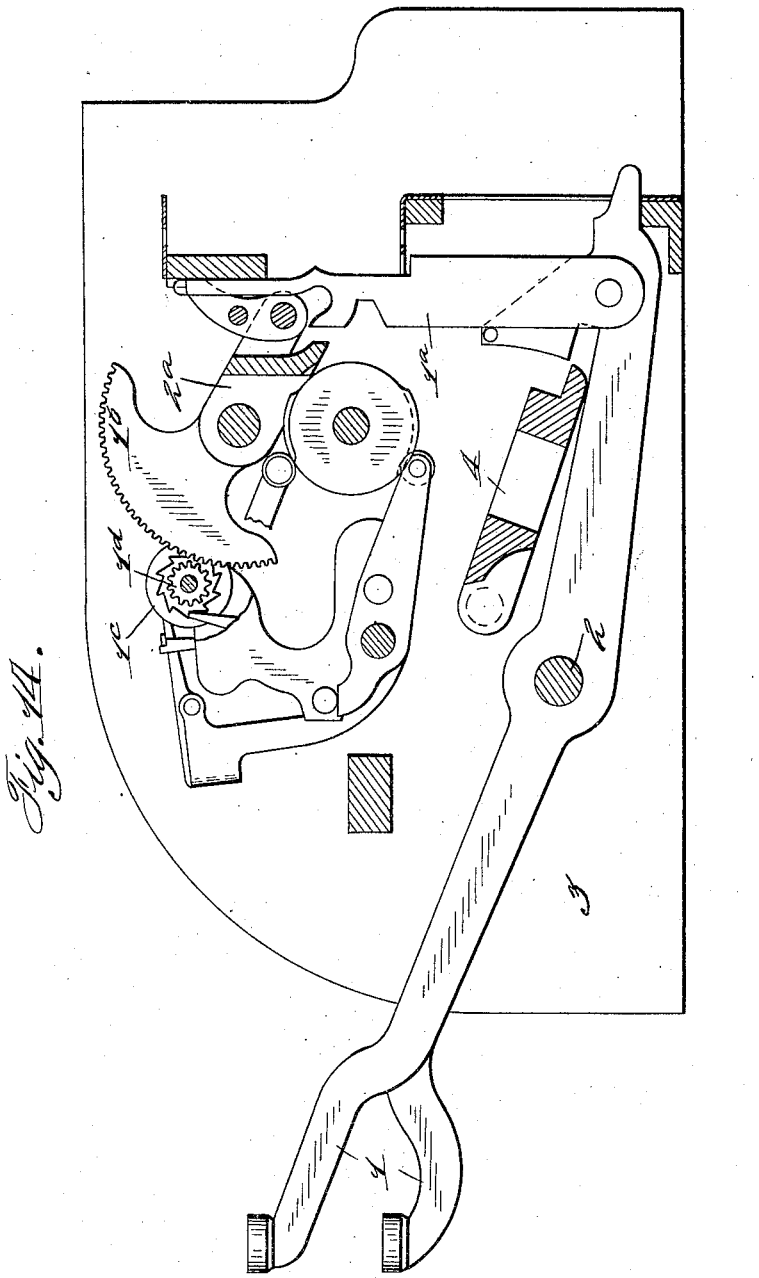

UNITED STATES PATENT OFFICE.

WILLIAM H. MUZZY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

941,378.  Specification of Letters Patent.  Patented Nov. 30, 1909.

Application filed June 8, 1905.  Serial No. 264,238.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers which, while performing their regular functions also audibly announce the amount of the purchase or its character.

One of the objects of the present invention is to provide a cash register with an improved phonographic mechanism for announcing the different amounts in dollars and cents.

A further object is to control the phonographic mechanism from the regular mechanism of the cash register in such manner that the operation of the phonographic mechanism takes place subsequent to the regular registering operation and will be dependent thereon.

With these and incidental objects in view, the invention consists in certain novel features of construction and combinations of parts, the essential elements of which are set forth in appended claims and a prefered form of embodiment of which is hereinafter specifically described with reference to the drawings which accompany and form part of this specification.

Of said drawings: Figure 1 represents a transverse section of the type of machine patented to Thomas Carney, dated January 22, 1895, No. 532,762, with my improvements applied thereto. Fig. 2 represents a detail sectional view of the devices for winding the motor spring. Figs. 3 and 4 represent detail sectional views looking in opposite directions and taken on line 3—3 of Fig. 5 of the motor ratchet and springs. Fig. 5 represents a partial rear elevation of the combined cash register and phonograph. Fig. 6 represents a top plan view of the mechanisms shown in Fig. 5. Fig. 7 represents a detail sectional view of the escapement mechanism for the motor shaft. Fig. 8 represents a detail view of the mechanism for locking the machine while the phonographic attachment is in operation. Fig. 9 represents an enlarged detail perspective view of the rewinding device of the motor spring. Figs. 10, 11 and 12 represent detail sectional views of the record cylinders, the reproducers and the controlling cams for the cents, dimes and dollars banks of keys respectively. Fig. 13 represents a detail view of the governor for the motor shaft, and, Fig. 14 represents a transverse vertical section through the type of machine to which my invention is applied showing the counter and connections.

The class of machine to which my improvements are applied may be described in general terms as follows:

A series of keys 1 are mounted upon a transverse shaft 2 secured in the side frames 3, with a universal bar or key coupler 4 arranged to be moved upon the operation of any one of the keys. Each key carries a standard $1^a$ for actuating a rocking frame $2^a$ which carries an operating rack segment $1^b$. This rack is arranged to mesh with a pinion $1^d$ upon a registering wheel $1^c$ as described in the aforesaid patent. Resting upon the rear ends of the keys are indicator standards 5 which carry tablets 6 at their upper ends, arranged to be brought into view to indicate the amount of the transaction upon the operation of their respective keys. Each of the indicator standards 5 is provided with a lug 7 arranged when raised, to rest upon the upper edge of a backrod 8 and thereby hold the tablet in indicating position. In the lower part of the casing is located the cash-drawer 9 which is released upon the operation of any one of the keys and ejected by a spring 10, which is interposed between the rear of said drawer and a part of the casing. For a further detail description of the said machine reference may be had to the aforesaid patent.

Secured to the lower end of each indicator standard 5 is an arm 11, which is provided at its end with an antifriction roller 12. These rollers are arranged to engage pivoted inclined levers 13, (see Fig. 5) and move said levers different distances in accordance with the value of the key operated. There are three of these levers and they are held in the positions shown in said figure by coil springs 14, which have their opposite ends secured to pins 15, projecting from the frame of the machine, and to the free ends of said levers. Secured to each of the levers 13 is a slotted plate 16, into the slot of which projects a pin 17 secured to a yoke shaped frame 18, which is arranged to slide laterally upon the motor shaft 19 and the cam shaft 20. Secured within this frame 18, of which there is one for each bank of keys, is a phonographic record carrying cylinder 21, which is arranged to slide laterally with the frame and independent of the motor shaft 19, but to revolve with said shaft by means of a spline 19$^a$ as shown in Figs. 10, 11 and 12. Located above the shaft 19 is a shaft 22 upon which are pivoted a series of reproducers 60; one for each cylinder.

A motor spring 35 is fast at one end to a disk 36 which is secured to the drive shaft 19, (see Figs. 3, 4 and 5). The other end of the spring is fast to the end of a short sleeve 37, which surrounds said shaft 19 and carries a ratchet wheel 38. Adjacent to this ratchet wheel is a disk 39 which carries a pawl 40 riding idly over said ratchet in one direction but adapted to rotate the ratchet as it moves in the opposite direction. The ratchet 38 is prevented from moving in but one direction by a retaining pawl 41 pivoted to the side frame 3. The pawls 40 and 41 are held into engagement with the ratchet 38 by suitable springs. Each of these pawls is only one-half the width of the ratchet 38, and they engage with the same in different planes, so that the pawl 40 as it is rotated may pass the pawl 41 without having any effect upon the same.

The disk 36 carries a pinion 57 which engages with a pinion 58 fast upon the cam shaft 20 from which it will be seen that any movement of the motor shaft 19 will be imparted to the shaft 20.

The disk 39 has secured to it a pinion 42 which meshes with a similar pinion 43 that has secured to it a pinion 44. Meshing with this latter pinion is a segmental rack 45 fulcrumed upon the hub of a lever 49 which is pivotally mounted upon the transverse shaft 2. The movement of this rack is sufficient to rotate the pinion 44 a complete revolution. This movement, by means of the larger pinion 43 rotates the pinion 42 a full revolution. The rack 45 has secured to it a goose-neck pawl 46, the lower end of which is formed with a shoulder 47 so as to engage a pin 48 mounted upon the lever 49, (see Fig. 9). This lever has a rearwardly extending portion 50 which rests upon a roller 51 carried within a bracket 52 made fast to the rear end of the regular sliding cash-drawer 9. The shoulder 47 of the pawl 46 is normally drawn into engagement with the pin 48 by means of a spring 53, one end of which is fastened to the pawl 46 and the other to the lever 45.

As the key-coupler 4 is rocked by an operation of any one of the keys 1, a projection 54 formed on said bar 4 will engage with the hook end of the pawl 46 as it completes its upward movement and thereby rock the shoulder 47 of said pawl out of engagement with the pin 48, allowing the spring 55 (see Fig. 9) to draw the segmental rack lever 45 downward as the universal bar 4 returns to normal position. Upon the initial movement of the bar 4 toward normal position the cash-drawer 9 will be released, as shown and described in said patent, and its spring 10 will propel it forward, thus allowing the spring 56, which connects the lever 49 to the frame, to draw the lever about its fulcrum 2. As the cash-drawer is closed the roller 51 will engage with the arm 50 and return the lever 49 to its normal position. This movement of the lever 49 will also return the segmental rack lever 45 by the pin 48 engaging with the shoulder formed by the cut away portion 47 of the pawl 46, which is pivoted to the lever 45. This return movement of the segmental lever 45 will rewind the motor spring 35 which was previously released by the return of the universal bar 4 to its normal position as hereinafter described. In the event of the cash-drawer being held in its closed position or allowed to remain open, the spring would be rewound upon the succeeding operation of the machine by the projection 54 formed on the universal bar 4 coming into contact with the under side of the segmental rack lever 45 and carrying the same to its upper position.

The shaft 20 carries cams 59, which control the reproducers 60 (see Figs 10, 11 and 12). These cams are so located upon the shaft 20 that they allow the reproducers to engage successively with the records on cylinders 21 for the dollars, dimes and cents banks in the order named; these reproducers being forced into engagement with said records by coil springs 61, and out of engagement by the aforementioned cams which engage with angular arms 59$^a$ formed integral with the reproducers 60. The record on each cylinder 21 is provided with nine record grooves and a blank, the latter being engaged by the reproducer when no key is operated in its respective bank. Flexible tubes 62 lead from the reproducers 60 to a main tube 63, the end of which is provided with a horn 64.

The motor shaft 19 is held in check by a hook arm 23 of an escapement lever 24 which is mounted upon a stub shaft 25 projecting from the right-hand side frame 3, (see Fig. 7). The hook arm 23 engages with a nose 26 formed upon a disk 27 which is secured to the shaft 19. The lever 24 is normally held in latching position by a coil spring 28 which surrounds the shaft 25, having one end fast to said shaft and the other end bearing on the under side of the said lever 24. This lever is also provided with an arm 29 which is thrown into engagement with the pin 30 mounted upon the disk 27, when the latching arm 23 is released. This action takes place just before the universal bar 4 reaches normal position, by an arm 31 secured to said bar coming into contact with a wiper pawl 32 secured to the forward end of the escapement lever 24. The object of the arm 29 and the pin 30 is to prevent the motor spring 35 from rotating the shaft 19 more than a full revolution, by forcing the operator to permit the arm 23 to pass into the path of the nose 26 formed upon the disk 27. The pawl 32 is free to move on its pivot, as the coupler 4 is raised by an operation of any one of the keys, but is restrained from moving in the opposite direction by its rear end coming into contact with a pin 33 projecting from the lever 24. This pawl 32 is held in its normal position by a coil spring 34.

Each cylinder 21 is formed at one end with a series of annular alining grooves 65. Pawls 66 made fast to a rock-shaft 67 are adapted to be forced into these grooves to properly aline the records by the key coupler 4 coming into contact with a forwardly extending are 68 fast to the rock-shaft 67 just before the motor shaft 19 is released.

Referring now to Fig. 8, 70 represents a disk secured to the shaft 19 and which is formed with a notch 71 into which the end of an arm 72 projects. The other arm 74 of said lever is arranged to move into the path of the key coupler 4 whenever the shaft 19 is rotated and thereby prevent a second operation of the machine or keys until the motor-shaft 19 has made a complete revolution, at which time a spring 75 will draw the arm 72 into the notch 71 of the disk 70.

In Figs. 5, 6 and 13 are illustrated a governor for the motor shaft 19 which consists of a worm 75 fast to said shaft, which meshes with a worm wheel 76 fast upon a short shaft 77 which is supported in brackets 78 which extend from the side frame. One end of the shaft 77 carries air resistance blades 80 which prevent too rapid a movement of the shaft 19 by its motor spring.

It will be seen from the above description that should it be desired to leave the cash-drawer open during a rush of business the winding of the operating spring for the phonographic attachment, will be accomplished by the movements of the key coupler, whereas, if the cash-drawer is closed after each operation this work will be accomplished during the closing movement. This construction leaves it optional with the operator as to whether he will put the motor spring under tension by the operation of the keys or by the operation of the cash-drawer. In machines of the character herein shown the only parts that remain in set position after the operation of the machine is complete, are the indicators, and I have utilized these parts for controlling my phonographic attachment as I wish the announcement of the amount to take place after the regular operation of the machine, as otherwise the noise incidental to the moving parts would prevent the enunciation of the phonograph being plainly heard. Further, it will be understood that in constructing a phonographic mechanism of the rotary cylinder type the record grooves or indentations are necessarily very small and it thus becomes necessary to accurately aline these grooves with the needle of the reproducer. This result I have accomplished by my peculiar alining devices formed itegral with the record carrying cylinder.

The general operation of the machine is as follows: When the keys are depressed the upward movement of the rear ends of the keys move the record cylinders 21 laterally into position to register properly with the reproducers. As these lateral movements of the records are controlled by the indicators and as the indicators remain set when the operating keys return, it will be seen that the records will remain in their set positions. As the key coupler returns toward normal position it operates the escapement 24 and permits the shaft 19 to make one complete revolution. This revolution of the shaft causes the records 21 to make a complete revolution and also by its connection with the shaft 20 causes the reproducers to be successively engaged with their record cylinders to announce the amounts from the different banks. When the cash-drawer is returned or closed, the motor mechanism is rewound, or, should the cash-drawer be left open, the motor mechanism is rewound upon the succeeding downward stroke of the keys.

It will, of course, be understood that while I have shown an adding mechanism operated by the keys, that printing devices or other forms of accounting mechanism may be equally well employed in a manner well known in the art.

I have shown and described my present improvements as applied only to the amount keys of the machine, but it will be readily understood that additional records and controlling devices may be provided whereby the special character of the transaction may be announced, together with the announcement of the amount.

While the form of mechanism here shown and described is admirably adapted to fulfil the objects primarily stated, it is to be understood that it is not intended to confine the invention to the one form of embodiment herein described, for it is susceptible of embodiment in various forms all coming within the scope of the claims which follow.

Having thus described my invention what I claim as new and desire to secure by Letters Patent is:

1. In a cash register, the combination with a series of keys, of a series of indicators operated by said keys, a phonographic mechanism, and means differentially operated by the different indicators and controlling the movements of the phonographic mechanism.

2. In a cash register, the combination with a series of keys divided into banks, of a phonographic mechanism for each bank, a reproducer for each bank, and means controlled by the keys for bringing the reproducers successively into coöperative relation with their phonographic mechanisms.

3. In a cash register, the combination with a registering mechanism of a series of keys for actuating said registering mechanism, a phonographic mechanism controlled thereby, and alining devices for said mechanism also controlled by the keys.

4. In a cash register, the combination with a registering mechanism of a series of keys for actuating said registering mechanism, a phonographic mechanism, a motor for the same, and means for winding up the motor by the keys.

5. In a cash register, the combination with a series of keys, of a phonographic mechanism controlled thereby, a cash-drawer, a motor for the phonographic mechanism, and means for winding the motor controlled both by the keys and by the cash-drawer.

6. In a cash register, the combination with a series of keys, of a phonographic record carrier, a series of indicators actuated by the keys, means for holding said indicators in set position while the keys return to normal position, connections whereby the indicators control the record carrier, and devices controlled by said keys for driving said record carrier after the same has been set.

7. In a cash register, the combination with a series of keys divided into banks, of a phonographic mechanism having records for dollars, dimes and cents, and means operated by the keys for causing the phonographic mechanism to successively announce dollars, dimes and cents.

8. In a cash register, the combination with a series of keys and a phonographic record carrier, of a series of tablet indicators one for and actuated by each key, connections from said indicators for setting said record carrier, and devices controlled by said keys for driving said record carrier after the same has been set.

9. In a cash register, the combination with a registering mechanism and a series of keys for actuating said registering mechanism, of a phonographic mechanism having a rotary record carrying device, a motor for actuating said device, and means for winding up the motor by the register actuating keys.

10. In a cash register, the combination with accounting devices, of means for selectively controlling the same, a phonographic mechanism, a motor for the same, and devices for winding up the motor by the selective means.

11. In a cash register, the combination with an accounting mechanism, of selective means for the same, a rotary record phonographic mechanism, a motor for the same, and means for winding up the motor from the selective mechanism.

12. In a cash register, the combination with a series of keys and a phonographic record carrier, of a series of indicators actuated by said keys, connections whereby said indicators differentially position said record carrier, and means controlled by said keys for driving said record carrier after the operation of the keys has been completed.

13. In a cash register, the combination with a series of keys, of a series of tablet indicators actuated thereby and carrying operating projections, movable members differentially actuated by said projections, and phonographic mechanism controlled by the movable members.

14. In a cash register, the combination with a series of keys divided into banks, of rotary record carrying mechanism, a series of reproducers corresponding to the banks, a motor for the record carrying mechanism, and means controlled by the motor for bringing the reproducers of the several banks successively into operative positions.

15. In a cash register, the combination with a registering mechanism and a series of operating keys therefor, of a phonographic mechanism, a motor for said mechanism wound up by the keys, and means for releasing the motor as the keys finish their operation.

16. In a cash register, the combination with a series of keys, of a phonographic mechanism, a motor for said mechanism wound up by the keys, a common key frame, and a latch for the phonographic mechanism operated by the common key frame.

17. In a cash register, the combination with a registering mechanism and a series of keys for actuating said mechanism, of a phonographic mechanism, a motor for the same wound by the keys, and means for locking the keys during the time the motor is operating the phonographic mechanism.

18. In a cash register, the combination with a registering mechanism, and keys controlling the operation of said mechanism, of a phonographic record carrier, connections whereby the record carrier is positioned under control of said keys, and means actuated by said record carrier for locking said keys against operation during the enunciating movement of said record carrier.

19. In a cash register, the combination with a registering mechanism and an operating mechanism therefor including keys, of a phonographic record carrier, means for positioning said record carrier under control of said keys, a motor having potential energy for driving said record carrier, connections from said operating mechanism for storing energy in said motor, and devices for locking said operating mechanism during the motor driven movement of said phonographic record carrier.

20. In a cash register, the combination with accounting devices, of an operating mechanism therefor, a phonographic mechanism, a motor for said latter mechanism wound up by the operating mechanism, and means for releasing the motor at the end of the movement of the operating mechanism.

21. In a cash register, the combination with a series of keys, of a common member operated by the keys, a phonographic mechanism, a motor for the same, and means for winding the motor from the common key mechanism.

22. In a cash register, the combination with a registering mechanism and an operating mechanism therefor, of a phonographic record carrier, a motor for actuating said carrier, means actuated by said operating mechanism for setting the record carrier and means actuated by said operating mechanism for winding the motor.

23. In a cash register, the combination with a registering mechanism and an operating mechanism therefor including keys, of a phonograph record carrier positioned under control of said keys, a motor and connections for driving said record carrier in its enunciating movement, means released by an element of said operating mechanism for normally locking said motor, and devices controlled by said motor connections for locking said operating mechanism during enunciating movement of said record carrier.

24. In a cash register, the combination with a registering mechanism, and an operating mechanism therefor, of a phonographic record carrier positioned by elements of said operating mechanism, a motor having potential energy and connections for driving said record carrier in its enunciating movement, means actuated by said operating mechanism for storing energy in said motor, and devices controlled by said motor connections for locking said operating mechanism during enunciating movement of said record carrier.

25. In a cash register, the combination with manipulative devices, of a registering device and a phonographic record carrier adjusted equivalently by said devices, a motor for actuating said carrier, and means operated by said devices for energizing said motor.

26. In a registering mechanism, the combination with a plurality of keys, of a registering device and a phonographic record carrier differentially and equivalently positioned by said keys, and means controlled by said keys for operating said record carrier after it has been positioned.

27. In a registering mechanism, the combination with manipulative devices and registering devices actuated thereby, of a sound record carrier, and means for differentially positioning said carrier by actuation of said devices, with means controlled by said devices for operating said carrier after the same has been positioned.

28. In a registering mechanism, the combination with manipulative devices, of a registering device and a sound record carrier differentially and equivalently positioned by said manipulative devices, and means for operating said carrier to announce a record after the same has been positioned.

29. In a registering mechanism, the combination with manipulative devices, of a registering device and a sound record carrier given a differential equivalent adjustment under control of said devices and means also controlled by said devices for operating said record carrier after the same has been adjusted.

30. In a registering mechanism, the combination with manipulative devices, of a registering device and a sound record carrier given a differential equivalent adjustment under control of said manipulative devices, and a motor for operating said carrier after the same has been adjusted.

31. In a registering mechanism, the combination with a registering device and a sound record carrier, of means for differentially adjusting both said registering device and carrier, and means for operating the said carrier to announce a desired record when the carrier has been adjusted.

32. In a registering mechanism, the combination with a registering device and a sound record carrier, of means for differentially adjusting both said registering device and said record carrier, a motor for operating said carrier after the same has been adjusted, and means controlled by said adjusting means for releasing the motor.

33. In a registering mechanism, the combination with a registering device, of a sound record carrier and means for announcing records therefrom, manipulative means for actuating said register, and having connections for equivalently positioning said record carrier, a motor for operating said record carrier, and devices controlled by said manipulative means and normally locking said motor.

34. In a registering mechanism, the combination with a registering device, of a sound record carrier having a plurality of records and means for announcing any desired record, of manipulative means for actuating said registering device and predetermining what record shall be announced, means for driving said record carrier in its enunciating movement after said manipulative means has been operated, and means for locking said manipulative means during actuation of said record carrier by its driving means.

35. In a registering mechanism, the combination with an operating mechanism, of a registering device and a phonographic record carrier equivalently adjusted by said operating mechanism, devices for driving said record carrier after the same has been positioned in its enunciating movement, and means controlled by said record carrier driving device for locking the operating mechanism during enunciating movement, of said record carrier.

36. In a registering mechanism, the combination with an operating mechanism, of a registering device, a phonographic mechanism, a driving mechanism for said phonographic mechanism controlled by said operating mechanism, connections from said operating mechanism for actuating said registering device and means for locking the operating mechanism while the phonographic mechanism is operating.

37. In a registering mechanism, the combination with an operating mechanism, of a registering device and a phonographic mechanism, both equivalently adjusted by said operating mechanism, a motor mechanism for said phonographic mechanism, and means controlled by said motor mechanism for locking said operating mechanism while the phonographic mechanism is operating.

38. In a registering mechanism, the combination with an operating mechanism, of a registering device and a phonographic record carrier equivalently adjusted by said operating mechanism, driving means for giving said phonographic mechanism an enunciating movement after the operating mechanism completes its movement, and devices controlled by said driving means for locking said operating mechanism during the enunciating movement of said record carrier.

39. In a registering mechanism, the combination with an operating mechanism, of a registering device and a phonographic record carrier equivalently adjusted by said operating mechanism, driving means for giving said record carrier an enunciating movement after it has been positioned by said operating mechanism, means normally locking said driving means with connections whereby an element of said operating mechanism releases said locking means, and means actuated by said driving motor for locking said operating mechanism during the enunciating movement of said record carrier.

40. The combination with a cash register having a plurality of keys adapted to be manually operated, of a phonograph attachment comprising a plurality of records, and means connecting the keys with and to actuate the records.

41. The combination with a cash register having a plurality of keys adapted to be manually operated, of a phonograph attachment comprising a plurality of records, and means connecting each of the keys with and to operate one of the records.

42. The combination with a cash register having a plurality of keys adapted to be manually operated, of a phonograph attachment comprising a plurality of rotatable records, and means connecting the keys with and to actuate the records.

43. The combination with a cash register having a plurality of keys adapted to be manually operated, of a phonograph attachment comprising a plurality of records, means connecting the keys with and to actuate the records, means engaging said records for producing sound vibrations, and means adapted to disengage the vibration producing means and the records at times.

44. The combination with a cash register having a plurality of keys adapted to be manually operated, of a phonograph attachment comprising a plurality of records, means connecting the keys with and to actuate the records, means engaging said records for producing sound vibrations, and means adapted to disengage the vibration producing means and the records during return movement of the records.

45. The combination with a cash register having a plurality of keys adapted to be manually operated, of a phonograph attachment comprising a plurality of records, and means connecting each key with and to actuate a record independently of the other records.

46. The combination with a cash register having a plurality of keys adapted to be manually operated, of a phonograph attachment comprising a plurality of records, means connecting each of the keys with and to actuate one of the records independently of the other records, means engaging said records for producing sound vibrations, and means adapted to disengage the vibration producing means and records at times.

47. In a cash register, the combination with an operating mechanism, of a phonographic mechanism comprising record mechanism and reproducer mechanism controlled by said operating mechanism, manipulative means for determining the relative position of the record and reproducer mechanisms, a shaft, and cams thereon having depressions at different peripheral points, and means for holding said record mechanism and said reproducer mechanism apart and adapted to be moved by said cams.

48. In a cash register, the combination with phonographic record mechanism, and keys for setting same, of reproducer mechanism normally held from contact with the record mechanism, a shaft, and means mounted on said shaft and having depressions at different peripheral points, and means holding said reproducer mechanism, and resting on said cams.

In testimony whereof I affix my signature, in the presence of two witnesses.

WILLIAM H. MUZZY.

Witnesses:
  W. M. McCarthy,
  C. L. Williss.